Figure 1:
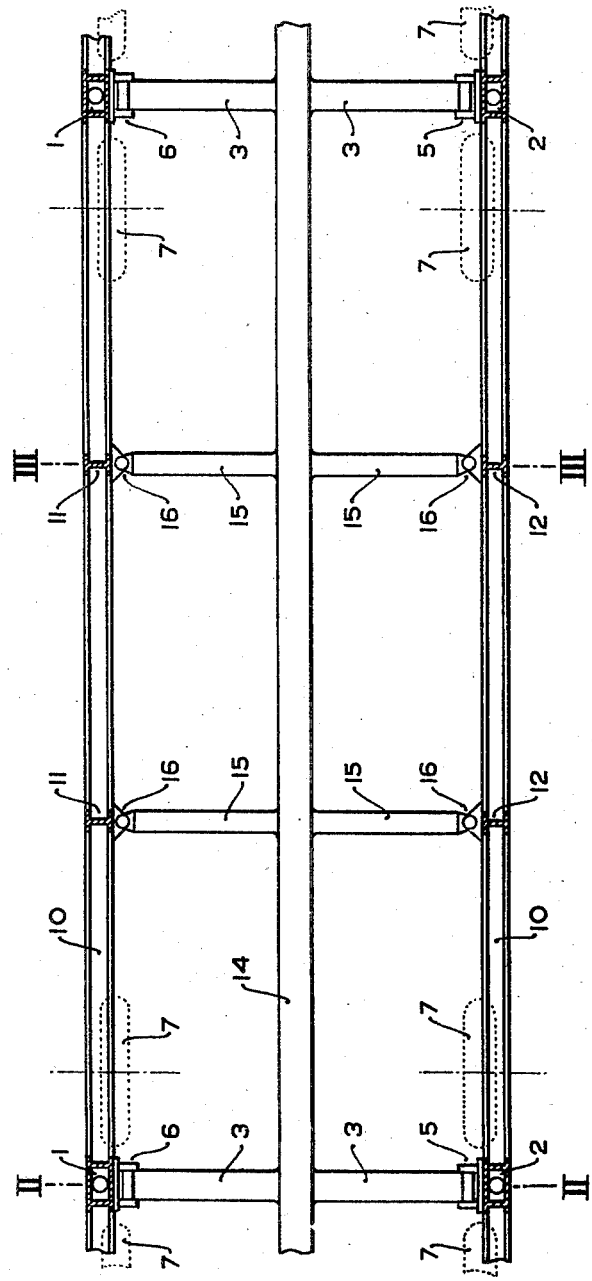

Aug. 1, 1950 L. H. BAGHUIS 2,517,272
STRUCTURALLY REINFORCED MOTORBUS BODY
Filed Dec. 5, 1945 2 Sheets-Sheet 1

INVENTOR
LUDOVICUS HENDRIKUS BAGHUIS
by Stevens and Davis
his attorneys

Aug. 1, 1950 L. H. BAGHUIS 2,517,272
STRUCTURALLY REINFORCED MOTORBUS BODY
Filed Dec. 5, 1945 2 Sheets-Sheet 2
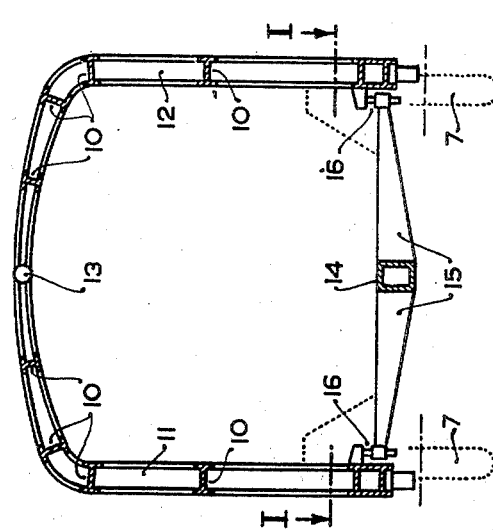
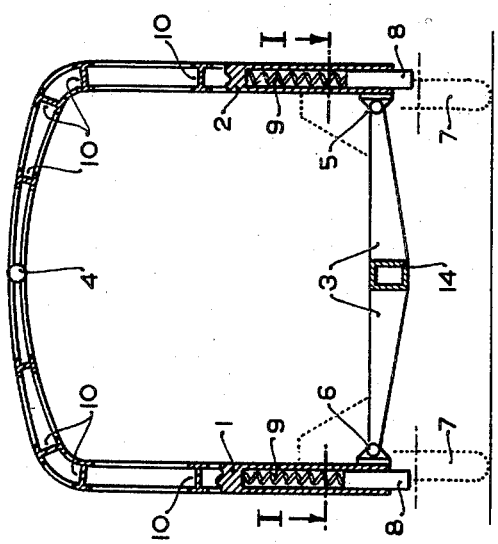
INVENTOR
LUDOVICUS HENDRIKUS BAGHUIS
by Stevens and Davis
his attorneys Patented Aug. 1, 1950

2,517,272

UNITED STATES PATENT OFFICE 2,517,272

STRUCTURALLY REINFORCED MOTORBUS BODY

Ludovicus Hendrikus Baghuis, Utrecht, Netherlands

Application December 5, 1945, Serial No. 632,844
In the Netherlands May 22, 1944

Section 1, Public Law 690, August 8, 1946
Patent expires May 22, 1964

3 Claims. (Cl. 280—124)

Many constructions are known of vehicles having a self-supporting body, to which, consequently, the wheels are connected directly, i. e. without the interposition of a chassis. Up till now, such a body has been designed as a rigid box constituted by side-walls, bottom and roof. In such a body, the load is transmitted, to a large extent, by the bottom to the side walls, which, as a consequence, form part of the supporting structure. It has now been found that, owing to this rigid connection between bottom and side-walls, uncontrollable stresses are set up, in said walls, which stresses necessitate a relatively high factor of safety, that is to say, a heavy construction, since otherwise they would cause rupture.

The invention avoids the rigid construction referred to and consists in this, that the body is supported by the wheels, or sets of wheels, through its side-walls and that the bottom of the body is suspended from those walls exclusively in or near the places, in which the wheels, or the sets of wheels, are attached to said walls. With this construction, the bottom transmits its load nearly directly to the wheels, or sets of wheels. The side-walls and the roof are almost relieved of load in vertical direction. The bottom is adapted to bend independently of the remainder of the body, viz. the side-walls and the roof. It has been found that a vehicle of this relatively flexible construction can be much lighter, better proof against shocks and bending and torsional stresses to which its body is liable to be exposed when travelling, and can be calculated more exactly than vehicles of the ordinary rigid construction.

Attention is drawn to the fact that the construction according to the present invention is fundamentally different from that wherein the bottom of the vehicle body constitutes a chassis supported by the wheels. With this prior construction, all stresses, also the longitudinal stresses, are taken up by the chassis, and the suspension of the body at a level above the centre of gravity thereof is almost impossible.

In order to relieve the side-walls and the roof as far as possible of stresses and to render the vehicle body as light as possible, I prefer a construction in which, in the connecting points between the side-walls and the wheels, or the sets of wheels, the body comprises main frames whose posts and girders are pivotally or flexibly interconnected, the posts having curved forms and supporting both the side-walls and the roof, and the girders supporting the bottom.

The bottom of the body may be connected to the side-walls in points other than its points of suspension so as to be adapted to bend independently of the side-walls, thus allowing the latter to better resist horizontal cross stresses, and also collapsing stresses when loaded longitudinally.

For the elucidation of the invention, reference is had to the drawing, in which:

Fig. 1 is a horizontal sectional view of the body of a motorbus according to the invention, Fig. 2 is a vertical cross sectional view along the line II—II in Fig. 1, and Fig. 3 is a vertical cross sectional view along the line III—III in Fig. 1.

In the drawing (Figs. 1 and 2), 1, 2 and 3 designate the posts and girders of main frames. The posts and girders of each main frame are pivotally or flexibly interconnected as at 4, 5 and 6. The body comprises two frames of this type, which are situated where the body is supported by the wheels, that is to say at about a quarter of the length of the body from the ends thereof. The wheels 7, illustrated in dotted lines, are attached to vertical rods 8, which are axially slidable in the posts 1 and 2 of the main frames and associated with the body by interposed vertical, helical springs 9. The posts 1 and 2 are bent and each has a vertical and a substantially horizontal portion to support the side-walls as well as the roof. They are interconnected by horizontal, longitudinal beams 10, to which the skin plates of the body may be secured. Between the two main frames the beams 10 may be interconnected by light, vertically extending studs 11 and 12 constituting auxiliary frames. These studs are also pivotally interconnected as at 13, i. e. at the ridge of the roof. The horizontal girders 3 of the main frames are interconnected by a longitudinal beam 14 provided with cross-arms 15 in the planes of the studs 11 and 12 of the auxiliary frames. The structure comprising the girders and beams 3, 14 and 15 serves to support the bottom of the body at 16. The arms 15 are attached to the side-walls of the body, in such a manner, that they are free to move and to bend in a vertical direction with respect to said walls without transmitting stresses thereto.

In this construction, the body is supported through its sidewalls by the wheels, and the bottom is suspended to said walls by means of four hinges 5 and 6 only. This construction can be very light, since no uncontrollable stresses can be generated therein and the load is taken up, for by far the greater part, by the main frames 1, 2, 3 and the longitudinal beam 14 only.

What I claim is:

1. A vehicle comprising a roof and side walls constituting a self-supporting unit, wheels, spring means attaching said wheels to the side walls of said unit, a bottom, means supporting said bottom and attaching it to said unit, said supporting means being provided in the vicinity of the spring means only, and means connected to said bottom and to the side walls of said unit, the points of connection of said means being relatively movable in the vertical direction and the means transmitting stresses at right angles to the side walls of the unit between said side walls and said bottom, said means connected to the side walls of said unit and to said bottom being located in longitudinally spaced relation to said supporting means.

2. A vehicle as claimed in claim 1 comprising at least two main transverse frames, each including a pair of arched posts directly interconnected at their upper ends and a girder interconnecting the lower ends of said posts, the posts serving to support the side walls and the roof and the girders serving as the only supports of the bottom, the wheels being attached by the spring means to said main frames only.

3. A vehicle as claimed in claim 1 wherein the means connected to the side walls of said unit and to said bottom constitute vertically engaging pin and socket connections, whereby the bottom is free to bend in a vertical direction but acts to restrain the side walls against lateral bending.

LUDOVICUS HENDRIKUS BAGHUIS.

REFERENCES CITED

The following references are of record in the file of this patent:

UNITED STATES PATENTS

| Number | Name | Date |
|---|---|---|
| 474,818 | Condon | May 17, 1892 |
| 620,189 | Shadbolt | Feb. 28, 1899 |
| 889,320 | Meglemer et al. | June 2, 1908 |
| 1,243,662 | Myers | Oct. 16, 1917 |
| 1,439,802 | De Miranda | Dec. 26, 1922 |
| 1,572,029 | Nelson et al. | Feb. 9, 1926 |
| 1,890,704 | Tasman | Dec. 13, 1932 |
| 2,142,173 | Broluska | Jan. 3, 1939 |

FOREIGN PATENTS

| Number | Country | Date |
|---|---|---|
| 273,488 | Italy | Apr. 18, 1930 |
| 463,838 | France | Dec. 27, 1913 |
| 552,283 | France | Jan. 18, 1923 |
| 850,730 | France | Dec. 23, 1939 |